March 28, 1939.  H. S. LAMB  2,152,489
BRAKE
Filed Aug. 5, 1935  2 Sheets-Sheet 1

Patented Mar. 28, 1939

2,152,489

UNITED STATES PATENT OFFICE

2,152,489

BRAKE

Howard Stanly Lamb, Youngstown, Ohio, assignor to The Cold Metal Process Company, Youngstown, Ohio, a corporation of Ohio Application August 5, 1935, Serial No. 34,755

10 Claims. (Cl. 188—83)

My invention relates to a brake and, in particular, to a brake for exerting substantially constant restraining force for considerable periods of time.

While numerous types of brakes have heretofore been employed in various applications, none of these were found satisfactory for a specific application with certain peculiar requirements of its own. This application is that of retarding the unwinding reels of reversing strip mills, and although my invention will be described with particular reference thereto, it is not limited to that application only, since it is applicable also in other fields such as oil well drilling rigs, paper machines, and the like.

Most brakes heretofore proposed have utilized a friction material having a relatively high coefficient of friction, and requiring only light pressures to make the brake effective. In brakes of this type, naturally, there is a great difference between the static friction and the dynamic friction. In other words, the brake exerts a much greater retarding force when the relatively movable parts are stationary than when they are moving.

This feature of previous brakes is particularly objectionable in strip mills because it is frequently the cause of breaking the strip. The brakes previously employed for other applications, furthermore, have seldom been designed to operate over long periods of time or to maintain a substantially constant retarding effect. These characteristics are desirable in a brake for the unwinding reels of strip mills and certain other applications, and it is the purpose of the invention, therefore, to provide a brake satisfactory for such applications.

In accordance with my invention, I provide relatively movable cooperating brake surfaces between which I employ a frictional material having a relatively low coefficient of friction. As a matter of fact, I employ a lubricated friction material. I provide means for causing the engagement of one of the braking surfaces with the friction material under pressure. Specifically this includes an expansible chamber and means for admitting fluid under pressure thereto. I apply considerable pressure to the braking surfaces, for example, 20 or 30 lbs. per square inch. This insures uniform contact throughout the braking area and prevents the braking load from being concentrated upon a relatively few "high spots", as is usually the case with a brake having a highly frictional material operated by low pressure.

The use of the lubricated frictional material for the brake is contrary to the principles of brake design heretofore followed. In fact, the use of such material for brakes was believed to be impossible, because the coefficient of friction varies with the temperature. To prevent or limit any such variation, however, I employ special cooling means and am therefore able to derive unusual advantages in brake construction by utilizing a lubricated frictional or braking material.

Specifically, my invention comprises a friction disk preferably mounted for rotation with the member to which the braking action is to be applied, the disk having a portion of its surface covered with the frictional material aforementioned. Adjacent the disk, is mounted an annular expansible chamber having connections to a source of fluid under pressure. The chamber is held against rotation so that when pressure is admitted thereto, the engagement between the chamber wall and the frictional material on the disk exerts a retarding action on the latter.

I also provide the expansible chamber with an outlet so that the fluid flows therethrough to carry away the heat generated at the contacting surfaces of the brake. A pressure regulator maintains the pressure within the expansible chamber, and I provide automatic means responsive to the temperature of the out-flowing liquid for controlling the size of the orifice to insure satisfactory cooling at all times.

For a complete understanding of the invention, reference is made to the accompanying drawings illustrating a preferred embodiment, but it will be understood that the invention may be otherwise embodied within the scope of my broader claims. In the drawings—

Figure 3 is a partial sectional view to enlarged scale along the line III—III of Figure 1; and Figure 4 is an elevation showing a frictional member forming part of the brake.

Figure 1:
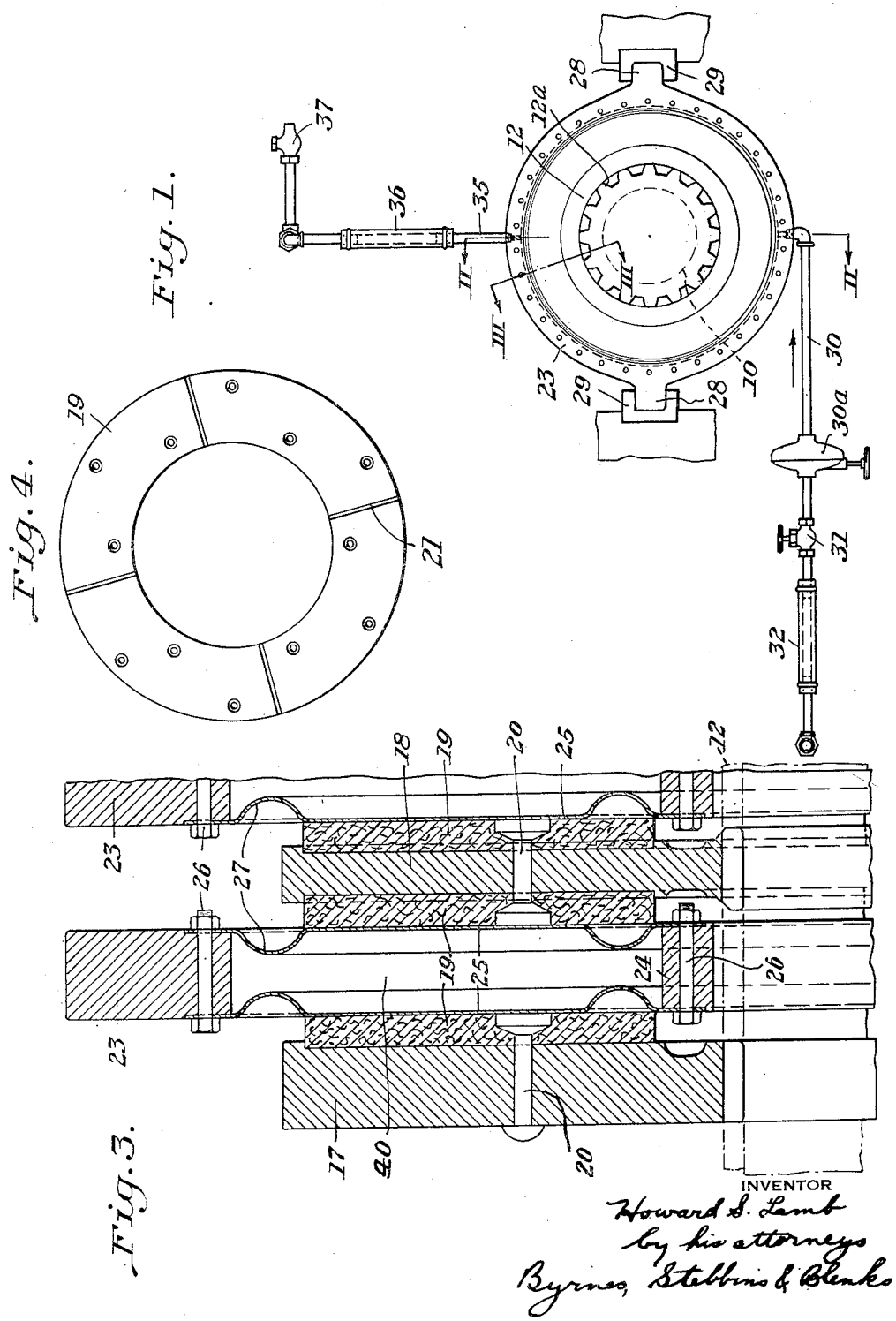
Figure 1 is a view, largely diagrammatic, of the brake in end elevation.

In the embodiment of the invention illustrated, a drive shaft 10 is adapted to apply power to a rotatable member 11 through a hub 12. The left hand end of the hub 12 is toothed as at 12a to form a drive connection with a grooved bore in the member 11. The hub 12 is rotatably mounted on the end of the shaft 10 in bearings 13 and 14, and includes a toothed disk 15 adapted to be engaged by a pawl (not shown), which may, for example, be carried on an arm keyed to the shaft 10. In the particular application under consideration, viz., coiling reels for reversing strip mills, as shown in Steckel Patent 1,744,018, it is desirable to be able to drive the wind-up reel at one stage of the rolling and, at another, to release it for reverse, idling rotation.

In explaining the invention in its broad aspects, however, the necessity, in a particular application, for the member to which the braking action is to be applied, to be positively driven at certain stages of the operation, may be disregarded. For the purpose of clearly understanding the invention, it may be assumed that the shaft 10 is fixed and merely provides bearings for the braking hub 12. It will be understood that in the specific application contemplated, the rotatable member 11 forms part of the unwinding reel of a reversing strip mill.

The brake of my invention indicated generally at 16, comprises a pair of spaced disks 17. Intermediate disks 18 are disposed between the disks 17. On the inner sides of the disks 17 and both sides of the disks 18, collars 19 of braking or frictional material are secured by means of rivets 20. The collars 19 have radial slots 21 therein for a purpose which will appear later. The collars 19 are preferably composed of asbestos fibre and graphite bonded by rubber with which they are vulcanized. This material has a coefficient of friction of about .185. The disks 17 and 18 are so mounted on the hub 12 as to rotate therewith, by means of screws 22 and keys or the like.

Pairs of concentric rings 23 and 24 are disposed between each pair of the disks 17 and 18. As shown, the inside diameter of the rings 23 is slightly greater than the outside diameter of the disks, while the inside diameter of the rings 24 is slightly greater than that of the portion of the hub 12 whereon the disks are positioned. Annular sheet metal members 25 are secured to the rings 23 and 24 by bolts 26. The members 25 have inturned beads 27 thereon, whereby they constitute an annular expansible chamber. The members 25 may conveniently be of stainless steel about .050" thick. It will be apparent from Figure 3 that upon outward displacement of the central portions of the members 25, they will engage the frictional collars 19 on both sides thereof.

Figure 2:
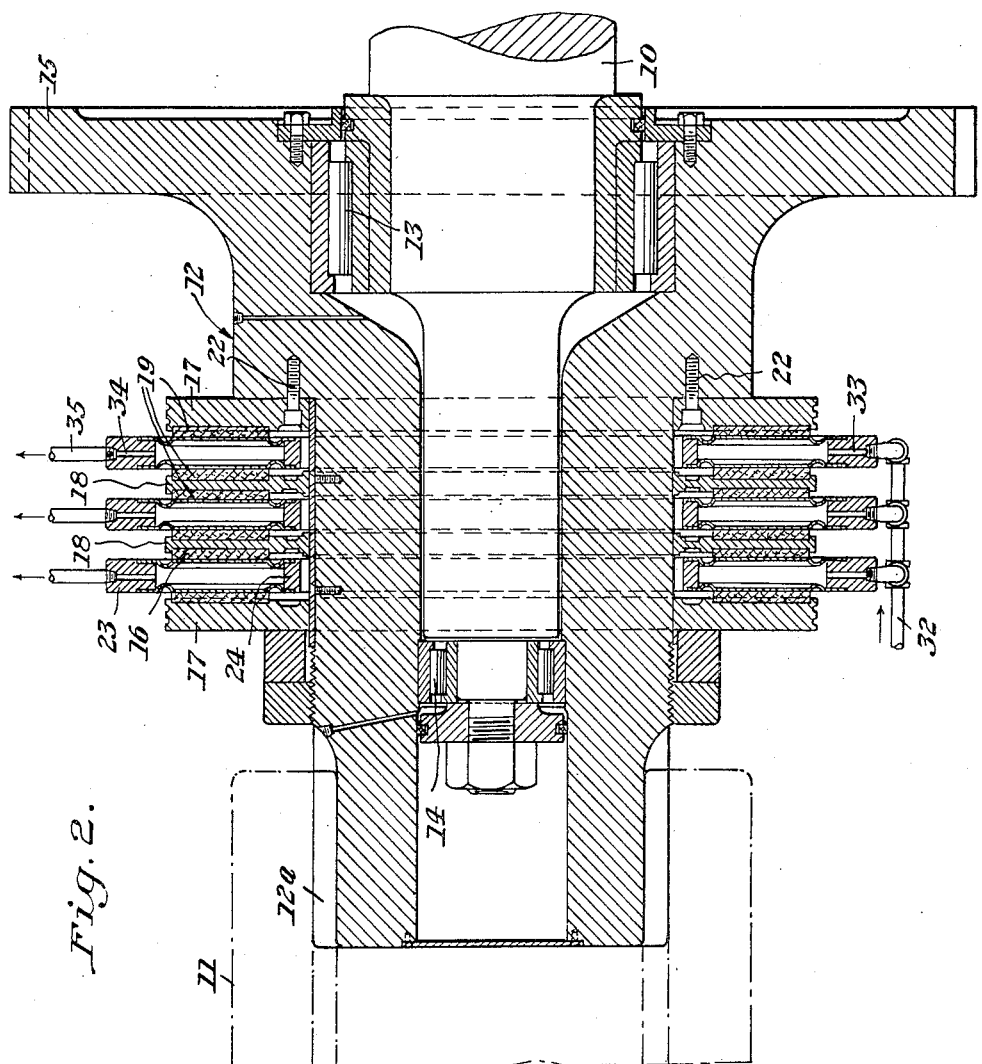
Figure 2 is a vertical sectional view therethrough taken along the line II—II of Figure 1.

The rings 23 have ears or lugs 28 thereon adapted to be engaged by fixed abutments 29 which prevent rotation of the rings and the expansible chambers of which they form a part. Fluid under pressure, for example, water, is supplied to the chambers defined by the rings 23 and 24 and members 25 from any suitable source through a connection 30 having an automatic pressure regulator 30a, an on-and-off control valve 31 and a flexible section 32 therein. The regulator 30a is manually adjustable to maintain various pressures in the brake. As shown in Figure 2, the connection 32 supplies fluid to all the chambers in parallel, the rings being bored radially at 33 to receive the connection. The rings 23 are also bored radially at 34 to provide outlets for the fluid. The outlets discharge into a connection 35 including a flexible portion 36 and an automatic thermostatic valve 37. The valve 37 is operated by a thermostat therein, in a known manner. The functioning of this device will be explained shortly.

The operation of the brake as a whole will probably be understood from the foregoing description of its construction. When the valve 31 is closed, no fluid is supplied to the expansible chambers 40 defined by the rings 23 and 24 and the members 25. The latter, therefore, do not engage the collars 19 with sufficient pressure to exert any material braking action. When the invention is applied to the reel of a reversing strip mill, the braking action can be practically entirely released simply by cutting off the supply of water to the chambers 40 so that the reel can be rotated by its drive without loss of energy through the brake.

When it is desired to retard rotation of the reel, however, for example, when it is serving as an unwinding reel to feed strip material to the mill, the desired braking action may be exerted on the reel to tension the strip being rolled, by opening the valve 31 to admit fluid under pressure to the chambers 40. As the side walls of the chambers expand, they press against the frictional collars 19. Since the chambers themselves are fixed against rotation, they exert a frictional drag or braking action on the hub 12 by virtue of their engagement with the collars 19. The pressure of the fluid is maintained constant at the selected value by the regulator 30a. The pressure existing on the interior of the chambers 40 thus remains constant so the braking action is uniform. The opening of the valve 37, however, causes increased flow of cooling fluid through chambers 40. Fluid traversing the chambers 40 has its temperature increased by the heat generated at the rubbing surfaces of the brake, the rise in the temperature of the fluid traversing the brake being substantially proportional to the energy absorbed by the brake. If desired, the regulator 30a may be replaced by a valve similar to 37, to vary the brake pressure with the temperature of the water discharged.

In order to prevent overheating, I provide the thermostatic valve 37. The thermostat thereof is adjusted so as to increase the opening of the valve 37 as the temperature of the fluid discharged from the brake increases. If the load on the brake is lowered, the temperature of the fluid being discharged will be reduced, permitting the partial closure of the valve 37 and thus maintain a substantially constant temperature rise of the cooling fluid, regardless of the load on the brake or the speed of rotation of the member 11.

The slots 21 in the collars 19 provide a space for the accumulation of any particles which may be removed from the members 27. Such particles are thereby prevented from being carried around and around between the collars and the members 27 which might cause scoring of the latter.

It will be apparent from the foregoing description that the invention provides a novel form of brake which has numerous advantages, particularly for the specific application for which it was first constructed. By utilizing a lubricated brake lining or friction element, and a relatively high braking pressure, I obtain uniform contact between the braking surfaces throughout their entire area. I also obtain a brake which exerts almost the same retarding effect whether the parts thereof are at rest or in motion. In other words, the static friction is about the same as the dynamic friction so that the danger of breaking strip on starting the rolling is materially reduced.

By supplying cooling fluid to the brake, I remove the heat generated and thus prevent it from affecting the operation of the brake by changing the coefficient of friction of the collars 19. The cooling also increases the life of the brake linings or collars 19. The brake may be designed for almost any capacity merely by increasing the number of cooperating disks and expansible chambers.

The rotating parts have a relatively low moment of inertia and this is of advantage since it prevents sluggishness in the response of the rotating parts to the action of the brake.

While I have illustrated and described but one preferred form of the invention, it will be apparent that many changes in the construction disclosed may be made without departing from the spirit of the invention or the scope of the following claims.

I claim:

1. A brake for a rotating member comprising a plurality of disks secured to said member for rotation therewith, an annular expansible chamber between each two adjacent disks, means for supplying fluid under pressure to the chambers to cause them to expand and engage said disks, and a restricted outlet in said chamber providing cooling circulation of fluid therethrough.

2. A brake for a rotating member comprising a pair of disks secured to said member for rotation therewith, a non-rotatable, annular, expansible chamber between said disks, means for supplying fluid under pressure to said chamber to expand it into engagement with said disks, and a restricted outlet in said chamber to provide cooling circulation of fluid therethrough.

3. A brake comprising a disk and an annular expansible chamber adjacent thereto, means mounting one of said elements for rotation, means holding the other against rotation, means for supplying fluid under pressure to the chamber to expand it into engagement with said disk, and a restricted outlet for said chamber, whereby flow of fluid therethrough cools the chamber walls.

4. A brake comprising a disk and an annular expansible chamber adjacent thereto, means mounting one of said elements for rotation, means holding the other against rotation, means for supplying fluid under pressure to the chamber to expand it into engagement with said disk, an outlet for said chamber, and means responsive to the temperature of the fluid discharged therethrough for controlling the flow of said fluid.

5. A brake comprising a disk an an annular expansible chamber adjacent thereto, means mounting one of said elements for rotation, means holding the other against rotation, means for supplying fluid under pressure to the chamber to expand it into engagement with said disk, an outlet for said chamber, and means responsive to the temperature of the fluid discharged therethrough for varying the size of the outlet.

6. A brake comprising frictionally engaging surfaces, an expansible chamber for causing engagement of said surfaces, a source of fluid under pressure connected to said chamber, and a restricted outlet from said chamber whereby the pressure of said fluid expands said chamber and the circulation of fluid through the chamber maintains the temperature thereof constant whereby to limit variations in the coefficient of friction between said surfaces.

7. A brake comprising frictionally engaging surfaces, an expansible chamber for causing engagement to said surfaces, means for supplying fluid under pressure to said chamber, an outlet for the chamber, means responsive to the temperature of the fluid leaving said outlet for controlling the flow of fluid through the chamber, and a regulator for maintaining a constant pressure in said chamber at all times.

8. A brake system comprising in combination a rotatable member to be braked, a brake lining and a brake shoe, the latter being actuated by a circulating cooling fluid under pressure for the brake shoe.

9. A brake mechanism comprising a rotatable member to be braked, a brake disc thereon, a relatively fixed annular brake shoe adapted to engage said disc, said shoe being carried on the wall of an annular expansible chamber, and a fluid circuit for said chamber including an exhaust passage providing fluid circulation through said chamber.

10. A brake mechanism comprising a rotatable member to be braked, a member thereon having a braking surface, a relatively fixed brake shoe adapted to engage said surface, and means for actuating said shoe including a fluid circuit, an expansible chamber, a connection from said chamber to said circuit, and an exhaust passage leading from said chamber providing circulation of fluid therethrough.

HOWARD STANLY LAMB.